(12) United States Patent
Sharifzadeh

(10) Patent No.: US 12,454,351 B2
(45) Date of Patent: Oct. 28, 2025

(54) VERTICAL TAKE-OFF AND LANDING AIRCRAFT

(71) Applicant: Darius Sharifzadeh, Camarillo, CA (US)

(72) Inventor: Darius Sharifzadeh, Camarillo, CA (US)

( * ) Notice: Subject to any disclaimer, the term of this patent is extended or adjusted under 35 U.S.C. 154(b) by 0 days.

(21) Appl. No.: 18/897,969

(22) Filed: Sep. 26, 2024

(65) Prior Publication Data

US 2025/0019072 A1    Jan. 16, 2025

Related U.S. Application Data

(63) Continuation-in-part of application No. 18/320,422, filed on May 19, 2023, which is a continuation of application No. 17/674,476, filed on Feb. 17, 2022, now Pat. No. 11,691,726, which is a continuation-in-part of application No. 16/905,336, filed on Jun. 18, 2020, now abandoned.

(60) Provisional application No. 62/863,521, filed on Jun. 19, 2019.

(51) Int. Cl.
*B64C 29/00* (2006.01)
*B64C 15/12* (2006.01)
*F02K 1/00* (2006.01)

(52) U.S. Cl.
CPC .......... *B64C 29/0033* (2013.01); *B64C 15/12* (2013.01); *F02K 1/004* (2013.01)

(58) Field of Classification Search
CPC ..... B64C 29/0033; B64C 15/12; F02K 1/002; F02K 1/004
See application file for complete search history.

(56) References Cited

U.S. PATENT DOCUMENTS

| 2,151,128 | A | * | 3/1939 | Looney | B64C 39/08 244/45 R |
| 2,797,547 | A | * | 7/1957 | Henri | B64C 15/02 244/73 R |
| 3,327,480 | A | * | 6/1967 | Gunter | F02K 1/002 60/761 |
| 3,388,878 | A | * | 6/1968 | Peterson | B64C 29/0033 244/12.3 |

(Continued)

FOREIGN PATENT DOCUMENTS

| DE | 102018116146 A1 | 1/2020 |
| DE | 102018116164 A1 | 1/2020 |

*Primary Examiner* — Tye William Abell
(74) *Attorney, Agent, or Firm* — Boudwin Intellectual Property Law, LLC; Daniel Boudwin

(57) ABSTRACT

A vertical take-off and landing aircraft that includes a fuselage which has a nose end, a tail end, and a plurality of seats disposed in an interior of the aircraft with vertical takeoff and conventional aircraft ability. A pair of rear wings extend outwardly from opposing sides of the fuselage between a cockpit and the tail end, and a pair of front wings extend outwardly from opposing sides of the fuselage between the cockpit and the nose end. Each of the pair of rear wings and the pair of front wings includes an adjustably mounted turbine which includes a statically mounted fan pod, a duct rotatably connected to the fan pod, and an adjustable nozzle rotatably connected to the duct. The adjustable nozzle is adjusted to a variety of configurations ranging between a vertical position and a horizontal position via the duct.

20 Claims, 12 Drawing Sheets

(56) References Cited

U.S. PATENT DOCUMENTS

| | | | |
|---|---|---|---|
| 3,835,643 A | | 9/1974 | De et al. |
| 3,972,490 A | * | 8/1976 | Zimmermann ..... B64C 29/0016 |
| | | | 244/12.3 |
| 4,641,800 A | * | 2/1987 | Rutan ................ B64C 5/14 |
| | | | 244/45 R |
| 4,922,711 A | * | 5/1990 | Brown .................. F02K 1/74 |
| | | | 60/230 |
| 5,115,996 A | * | 5/1992 | Moller ............... B64C 29/0025 |
| | | | D12/326 |
| 5,769,317 A | * | 6/1998 | Sokhey .................. F02K 3/025 |
| | | | 239/265.23 |
| 7,472,863 B2 | * | 1/2009 | Pak ...................... B64D 35/04 |
| | | | 244/12.5 |
| 2004/0026563 A1 | * | 2/2004 | Moller .................. B64C 37/00 |
| | | | 244/12.4 |
| 2004/0245374 A1 | | 12/2004 | Morgan |
| 2005/0120702 A1 | * | 6/2005 | Fink ...................... F02K 1/004 |
| | | | 60/204 |
| 2006/0022084 A1 | | 2/2006 | Magre |
| 2013/0062455 A1 | | 3/2013 | Lugg et al. |
| 2015/0274289 A1 | | 10/2015 | Newman et al. |
| 2016/0144956 A1 | | 5/2016 | Parks |
| 2020/0009974 A1 | | 1/2020 | Bender et al. |
| 2020/0010209 A1 | | 1/2020 | Bender |
| 2020/0290742 A1 | * | 9/2020 | Kumar .................. B64D 27/10 |

\* cited by examiner

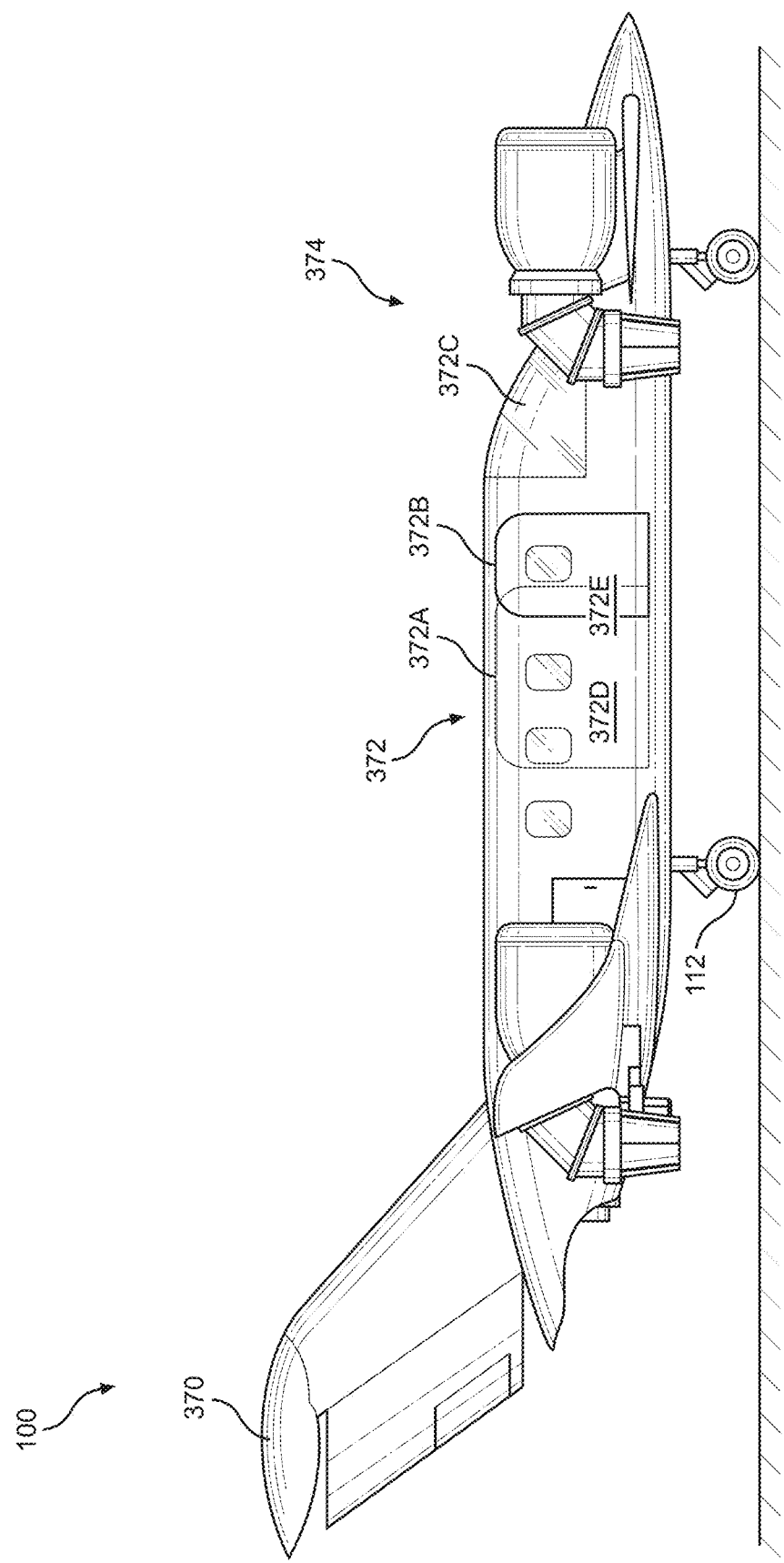

VERTICAL TAKE-OFF AND LANDING AIRCRAFT

CROSS-REFERENCE TO RELATED APPLICATIONS

This Continuation-In-Part application claims the benefit of U.S. Non-Provisional application Ser. No. 18/320,422 filed May 19, 2023, which is a Continuation-In-Part application claiming benefit of to U.S. Non-Provisional application Ser. No. 17/674,476, filed on Feb. 17, 2022, which claims benefit as a continuation of U.S. Non-Provisional application Ser. No. 16/905,336 which claims to Provisional application 62/863,521 filed on Jun. 19, 2019. The above identified patent applications are herein incorporated by reference in their entirety to provide continuity of disclosure.

BACKGROUND OF THE INVENTION

The present invention relates to an aircraft. More particularly, the present invention provides for a high-performance aircraft capable of vertical and horizontal flights. In order to safely utilize its capability, a fly-by-wire system is used as a primary system and is followed by a conventional and mechanical system as a back-up system.

Many people travel great distances utilizing commercial aircraft. Such aircraft allow passengers to bypass traffic on the roads, railways systems, and waterways and allow for a great speed of transport. However, such commercial aircraft are immensely expensive to produce and operate. For example, traditional aircraft require large quantities of fuel to travel the required distances. Traditional aircraft also require runways which are large and long stretches of pavement solely devoted to enabling an aircraft to attain a minimum take-off speed or decelerate from a traveling speed. These aircraft utilize horizontal thrust from their engines and angle themselves to gain or lose altitude. Such procedures necessitate such long runways to enable them to attain the desired speed. Such runways are only available at airports which may only be found in specific locations and are few and far between. Therefore, operation between locations is limited to these pre-existing ports. Airports are typically very busy, thus operations between locations may be very difficult for smaller aircraft. Therefore, a small aircraft that is capable of performing vertical take-off and landing procedures, that may also provide horizontal thrust, thereby eliminating the need for runways, air strips, and devoted airports and the like is desired.

Devices have been disclosed in the known art that relate to aircraft. These include devices that have been patented and disclosed in patent application publications. However, the devices in the known art have several drawbacks. Some aircraft rely on horizontally mounted engines to provide horizontal thrust. These aircraft utilize complex systems of rudders, wings, and flaps to adjust the angle of the entire aircraft to provide slow and gradual vertical displacement in order to gain and lose altitude. Additionally, such aircraft require air to constantly be moving over their wings in order to attain lift. Such aircraft are especially at the mercy of the runway and airstrip system. Helicopters are capable of performing vertical takeoff and landing procedures, but such aircraft are extremely expensive and are harder to fly than planes. Helicopters use their rapidly spinning rotors to create momentum and lift. In order to travel, the entire helicopter must be pitched at an angle to transfer the vertical momentum into forward or rearward momentum.

Some specialized planes have been developed that are capable of limited vertical take-off and landing procedures. However, such aircraft typically use a large number of low-powered rotors spaced around a framework of the fuselage to provide vertical lift. These systems have a short battery life and may typically only provide power for under an hour. Additionally, such complex frameworks and numbers of rotors add to the weight of the vehicle and greatly impact the aerodynamics of the vehicle when not in use. Some other types of specialized planes use a small number of fans incorporated into the fuselage or wings of the craft. These fans may pivot and rotate to a limited degree and offer some vertical momentum but lack the ability to make fine adjustments. These craft also rely on pitching and angling the body of the aircraft in order to attain true freedom of movement in all directions.

What is needed is a vertical take-off and landing aircraft that includes a fuselage which has a nose end, a tail end, and a plurality of seats disposed in an interior of the aircraft with vertical takeoff and conventional aircraft ability. The present invention substantially diverges in design elements from the known art and consequently it is clear that there is a need in the art for an improvement to existing aircraft. In this regard the present invention substantially fulfills these needs.

SUMMARY OF THE INVENTION

In view of the foregoing disadvantages inherent in the known types of aircraft now present in the prior art, the present invention provides an aircraft capable of performing vertical take-off and landing procedures as well as transitioning to a horizontal thrust configuration via adjustable ducts and adjustable nozzles connected to fan pods statically mounted on the wings of the aircraft.

The present invention relates to an aircraft. More particularly, the present invention provides for a high performance aircraft capable of vertical and horizontal flights. In order to safely utilize its capability, a fly-by-wire system is used as a primary system and is followed by a conventional and mechanical system as a back-up system.

The present vertical take-off and landing aircraft comprises a fuselage which has a nose end, a tail end, and a plurality of seats disposed in the interior. A pair of rear wings extend outwardly from opposing sides of the fuselage between a cockpit and the tail end, and a pair of front wings extend outwardly from opposing sides of the fuselage between the cockpit and the nose end. Each of the pair of rear wings and the pair of front wings includes an adjustably mounted turbine which comprises a statically mounted fan pod, a duct rotatably connected to the fan pod, and an adjustable nozzle rotatably connected to the duct. The adjustable nozzle may be adjusted to a variety of configurations ranging between a vertical position and a horizontal position via the duct. The adjustably mounted turbine enables the aircraft to adjust thrust through vectors ranging between horizontal and vertical. In some embodiments, the duct is segmented and includes a bellowed section. In other embodiments, the entire duct is bellowed.

The present vertical take-off and landing aircraft further comprises an exhaust vent and a support base disposed on the adjustably mounted turbine, wherein the exhaust vent includes a base and a plurality of exhaust pipes and the base is disposed on top of the adjustably mounted turbine, wherein the base is disposed on top of the adjustably mounted turbine and the support base is disposed underneath the adjustably mounted turbine and is fitted to support the bottom of the adjustably mounted turbine, further comprising a gas engine fire shut-off lever to allow shutting off fuel to an engine during a fire or explosion, and further comprising a rudder trim that allows for adjustments to a rudder of the vertical take-off and landing aircraft.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 3AA shows a side perspective view of an embodiment of the vertical take-off and landing aircraft.

DETAILED DESCRIPTION OF THE INVENTION

Figure 1:
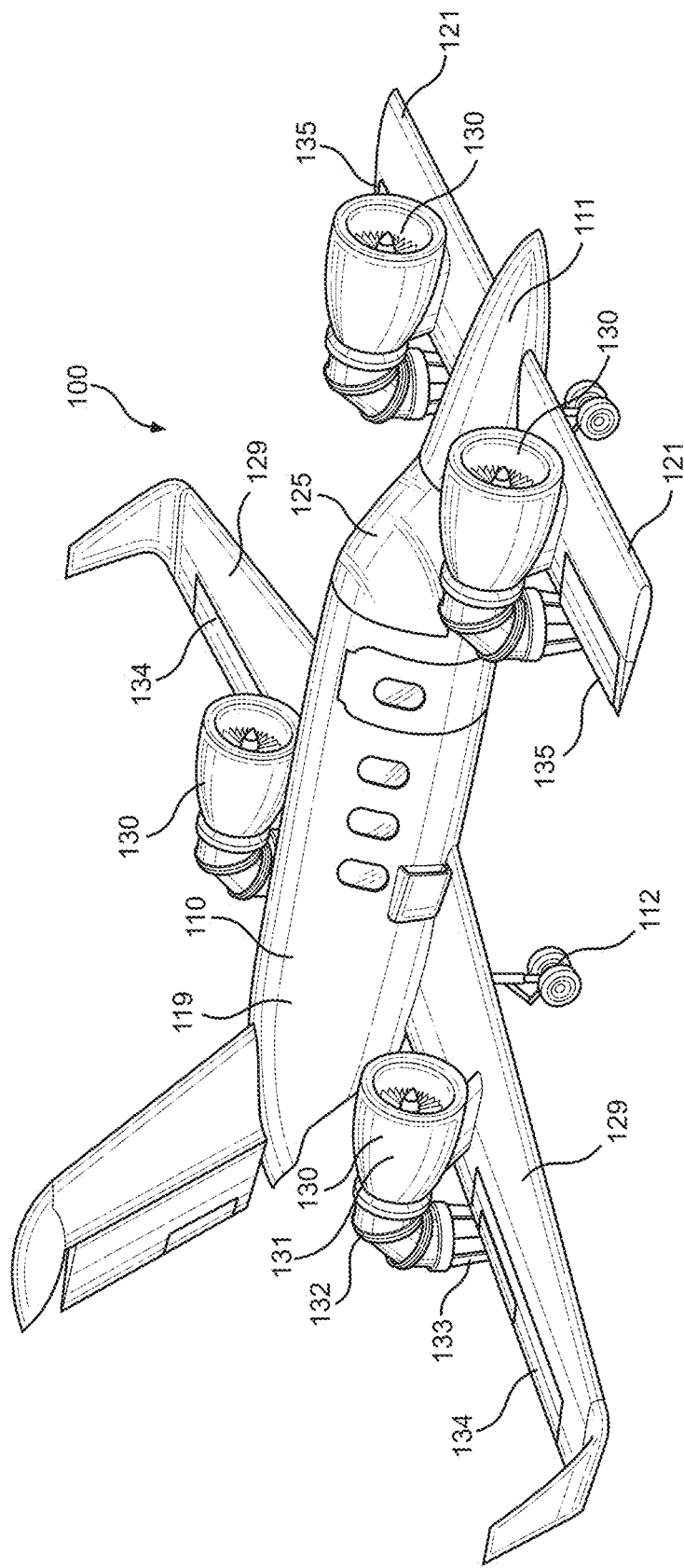
FIG. 1 shows a perspective view of an embodiment of the vertical take-off and landing aircraft.

Reference is made herein to the attached drawings. Like reference numerals are used throughout the drawings to depict like or similar elements of the vertical take-off and landing aircraft. For the purposes of presenting a brief and clear description of the present invention, a preferred embodiment will be discussed as used for the vertical take-off and landing aircraft. The figures are intended for representative purposes only and should not be considered to be limiting in any respect.

Referring now to FIG. 1 there is shown a perspective view of an embodiment of the vertical take-off and landing aircraft 100.

The vertical take-off and landing aircraft 100 may comprise a fuselage portion 110 including a nose end 111 and a tail end 119. A pair of rear wings 129 may extend outwardly from opposing sides of the fuselage 110 between a cockpit 125 and the tail end 119. A pair of front wings 121 may extend outwardly from opposing sides of the fuselage 110 between the cockpit 125 and the nose end 111. In one embodiment, the pair of front wings 121 and the pair of rear wings 129 may be metal with composite material or the like. A machined center section of the fuselage 110 may allow the pair of front wings 121 and the pair of rear wings 129 to attach thereto.

Each rear wing 129 of the pair of rear wings 129 may comprise an aileron 134. Each front wing 121 of the pair of front wings 121 may comprise an elevator 135 from a pair of elevators 135. The pair of ailerons 134 may be configured to control the lateral balance of the vertical take-off and landing aircraft 100. The pair of elevators 135 may be configured to control the pitch of the vertical take-off and landing aircraft 100. In conjunction, the pair of ailerons 134 and the pair of elevators 135 may allow the operator to control the direction of the vertical take-off and landing aircraft 100.

In the shown embodiment, the fuselage 110 may be in a canard configuration. One of ordinary skill in the art will understand how a canard configuration differs from other designs and configurations of the fuselage 110. Further, in the shown embodiment, the fuselage 110 may be a fixed-wing canard configuration which is inherently stable and structurally rigid in load bearing. In the preferred embodiment, the fuselage 110 may comprise metal and composite materials to provide strength, durability, and stability and the like. Further, in the preferred embodiment, the floor may be solid aircraft aluminum with machined frames, keels, ribs, brackets, gussets, and the like. In one embodiment, a 3D printed fuselage 110 may be attached to an already prepared floor resembling an upside down/inverted "U".

A plurality of trailing-link landing gear 112 may be disposed on a rear surface of the fuselage 110, such that in the case of a hard landing, the trailing-link landing gear 112 enables the vertical take-off and landing aircraft 100 to withstand 8 Gs of force. The present disclosure may not be limited to the type of landing gear utilized and contemplates other types that perform the function of enabling a safe landing. The trailing-link landing gear 112 may be set at an approximate 10-degree angle when rotating or the like.

In the preferred embodiment, the vertical take-off and landing aircraft 100 may be operated as a fly-by-the-wire system and is capable of autonomous control. In a further embodiment, the fly-by-the-wire system may be combined with an autopilot system and mechanical back-up to achieve stable control of the vertical take-off and landing aircraft 100. It should be understood by one of ordinary skill in the art that such an autonomous control system may be able to recover from unusual or unwanted attitude in several ways. As a backup, conventional flight controls may also be provided. As a last resort, a button (not shown) may be disposed in the cockpit 125 which automatically and instantaneously reverts controls back to conventional flight controls.

Each of the pair of front wings 121 and the pair of rear wings 129 may include an adjustably mounted turbine 130. The adjustably mounted turbine 130 may comprise a statically mounted fan pod 131, a duct 132 rotatably connected to the fan pod 131, and an adjustable nozzle 133 rotatably connected to the duct 132. In some embodiments, the adjustably mounted turbine 130 may slide in the fore and aft directions to provide further adjustability, however, in the shown embodiment, the fan pod 131 of the adjustably mounted turbine 130 may be permanently affixed to the pair of front wings 121 and the pair of rear wings 129. The adjustable nozzle 133 may be configured to be adjusted between a vertical position, wherein the output of the adjustable nozzle 133 may be perpendicular to the associated pair of front wings 121 and the associated pair of rear wings 129, and a horizontal position, wherein the adjustable nozzle 133 may be parallel to the associated pair of front wings 121 and the associated pair of rear wings 129, via the duct 132. The duct 132 may be a bifurcated duct or the like.

Figure 2:
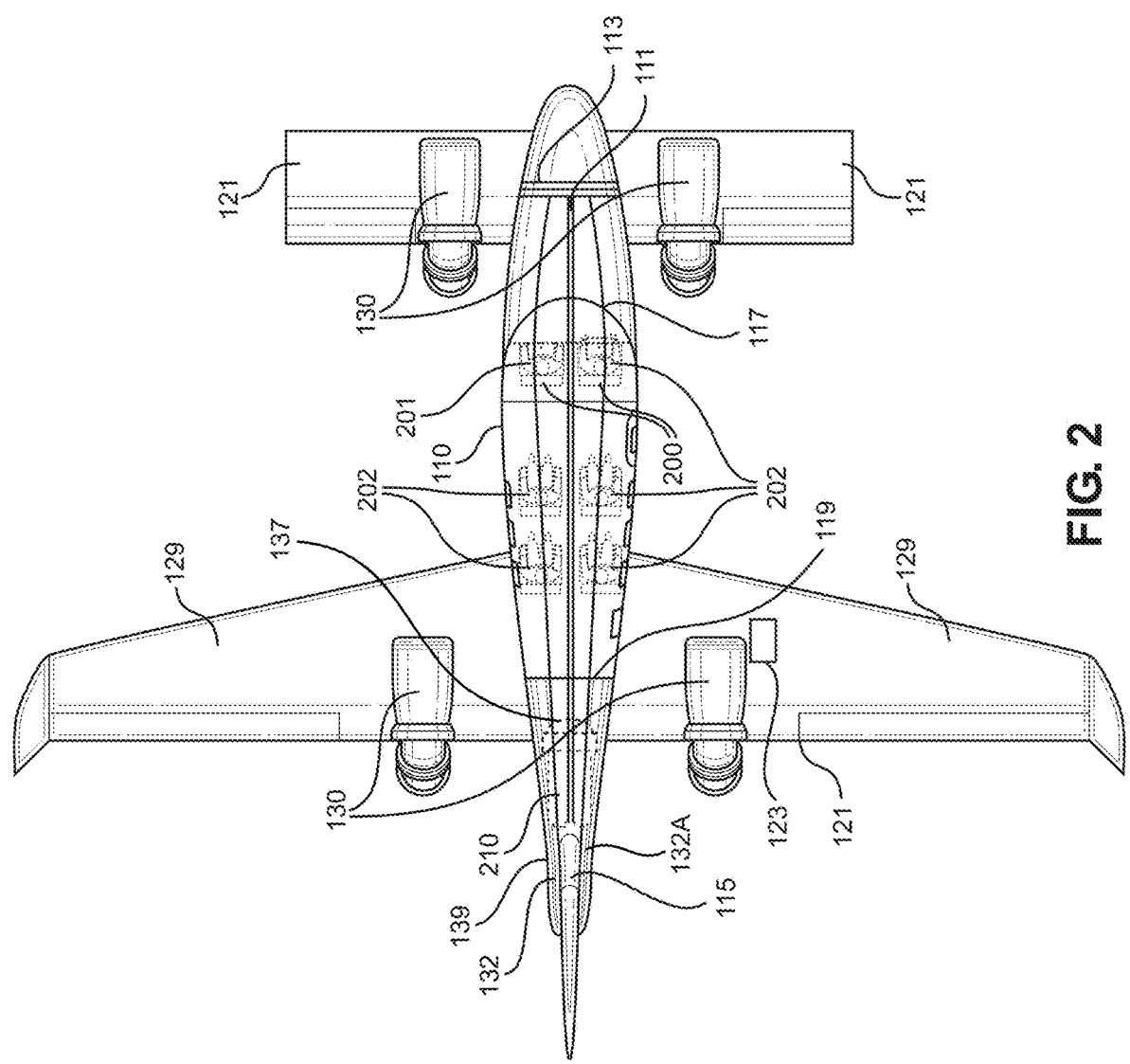
FIG. 2 shows a first top-down interior view of an embodiment of the vertical take-off and landing aircraft.

Referring now to FIG. 2 there is shown a top-down interior view of an embodiment of the vertical take-off and landing aircraft 100.

The fuselage 110 may comprise a plurality of seats 200 which are configured for passengers 202 to sit in during transport as well as a seat for a pilot 201. One of ordinary skill in the art will understand that the number of seats 200 and design thereof may vary based on the size of the fuselage 110 and the desired comfort of the passenger 202. In the shown embodiment, six seats 200 may be disposed in a two-by-two configuration in a rear portion of the fuselage 110 and a two-by-one configuration in a front portion of the fuselage 110.

In one embodiment, the front portion of the fuselage 110 may include a C-shaped channel 211 between a forward pressure bulkhead 113 to a vertical fin spar 115. The C-shaped channel 211 may be approximately 5 inches wide that forms an extrusion channel from the bulkhead 113 to a vertical fin spar 115. The vertical fin spar 115 may fork-out to provide stability and control of the vertical take-off and landing aircraft 100 as well as provide directional stability.

In one embodiment, the front portion of the fuselage 110 may include a plurality of longerons 117 that may extend from the forward bulkhead to the aft frame. The longerons 117 may be made of metal or a composite shell or skin or the like. In one embodiment, the pilot 201 seat 200 may provide access to controls for the vertical take-off and landing aircraft 100. In another embodiment, one or both of the two front seats 200 may be utilized to control the vertical take-off and landing aircraft 100 while the remaining seats 200 may be utilized to rest while the vertical take-off and landing aircraft is in use. The center of gravity of an aircraft is of extreme importance. The center of gravity needs to be determined depending on the variables for that particular day. In order to calculate the center of gravity one must have the weight of the aircraft, the number of passengers, the weight of the amount of fuel onboard, and the weight of the cargo for the current trip. In one embodiment, the vertical take-off and landing aircraft 100 may maintain a maximum cruise speed of approximately 365 knots and has a range of approximately 1,500 nautical miles or the like.

The fuselage 110 may comprise a plurality of machinable ribs and a lower surface skin attached together with a plurality of flush head fasteners. This is a relatively cost efficient to provide protection to the fuselage 110 in case of a battery pack overheating from fire, foreign objects, rust and also provides durability and ease of maintenance.

A single gas-powered turbofan 210 may be disposed in a rear portion of the fuselage 110. The rear portion of the fuselage 110 may include a rear pressure bulkhead 117. There is also a rear spar 121 disposed in the rear portion of the fuselage 110 as well as a fuel tank 123. The gas-powered turbofan 210 may provide power for onboard electronics, avionics, air conditioning, lighting, and the like. In one embodiment, the gas-powered turbofan 210 may be used for regenerative charging of at least one associated electric battery pack during multiple phases of flight such as windmilling, taxiing, descent, and the like. In one embodiment, the gas-powered turbofan 210 may be a single Williams FJ44-3SP engine (no number) disposed in the aft of the fuselage 110. The gas-powered turbofan 210 may be used as a generator and may charge batteries on the ground and during flight with no auxiliary power unit required. The present disclosure is not limited to the type of gas-powered turbofan 210 utilized, and while the Williams FJ44-3SP engine may be utilized in the preferred embodiment, similar gas-powered turbofans 210 are contemplated by the present disclosure.

In addition to the gas-powered turbofan 210 disposed in the aft of the fuselage 110, the adjustably mounted turbines 130 may be mounted to the pair of front wings 121 and the pair of rear wings 129. In one embodiment, each of the fan pods of the adjustably mounted turbine 130 may include and may be powered by two electric motors in tandem, which may be shrouded and attached to an electronically controlled vectoring thrust nozzle. The adjustably mounted turbines 130 may provide vertical, lateral, and horizontal thrust as further detailed below. The combination of the gas-powered turbofan 210 and the adjustably mounted turbines 130 may provide several layers of redundancy in the case of engine failure. For example, if one of the two electric motors in an adjustably mounted turbine 130 fails, the other electric motor may be able to compensate. Similarly, if an entire adjustably mounted turbine 130 fails, the other three adjustably mounted turbines 130 may compensate for the loss. Finally, in the case of failure of the adjustably mounted turbines 130, or in the situations where the adjustably mounted turbines 130 may not be utilized, such as when the vertical take-off and landing aircraft 100 is cruising, the gas-powered turbofan 210 may be able to produce power and thrust as needed. The gas-powered turbofan 210 may be a gasoline engine that may run at a rotations per minute or RPM that does not allow for an engine flame out. However, this RPM will generate a minimum thrust that may interfere with pinpoint accuracy of landing or takeoff. Because of the relatively low RPM, it is recommended that a nozzle vectoring thrust angle be at least past the vertical which is greater than approximately 92 degrees.

Figure 2A:
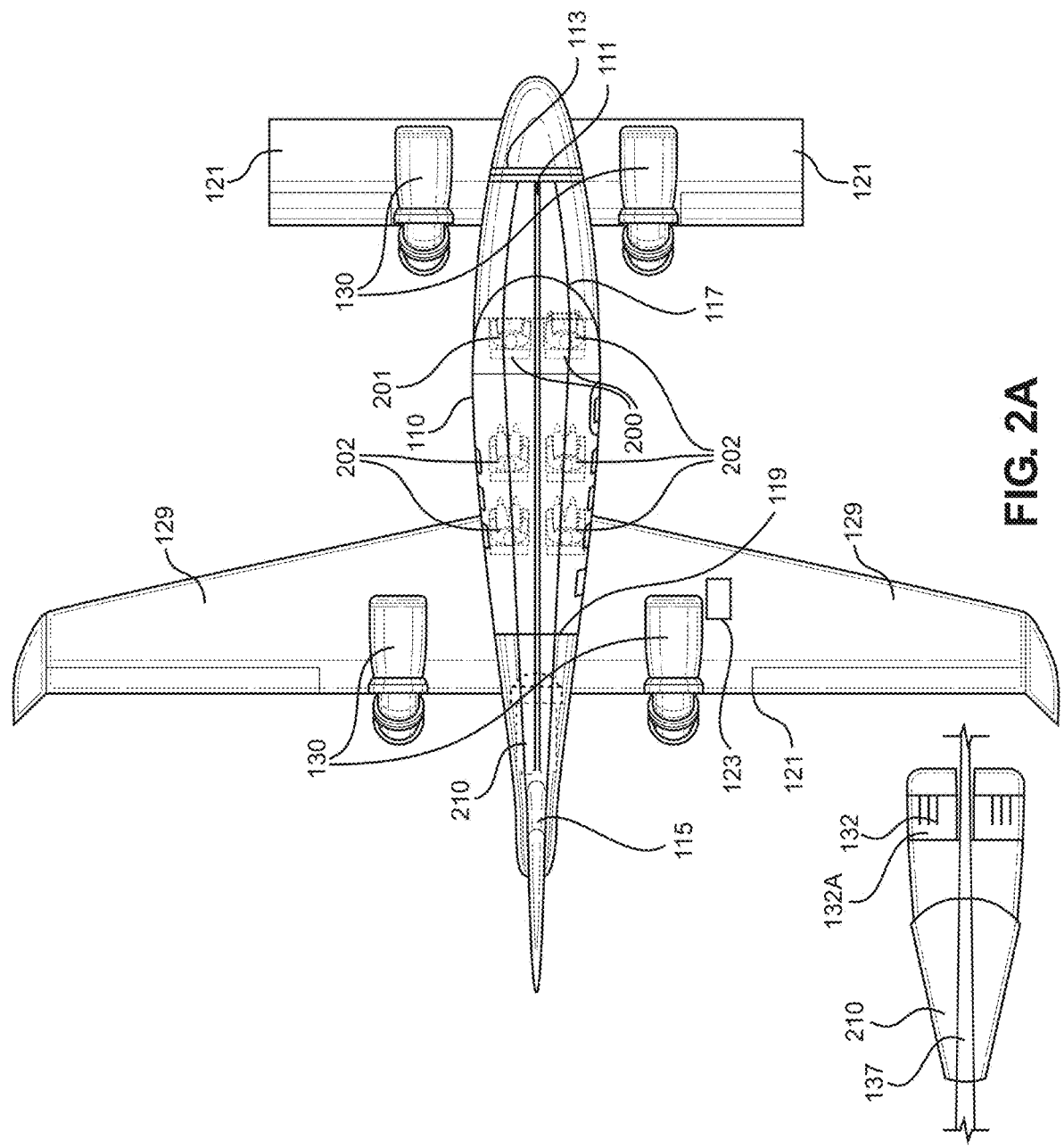
FIG. 2A shows a second top-down interior view of an embodiment of the vertical take-off and landing aircraft.

FIG. 2A also shows a duct 132, a gas-powered turbofan (FIG. 2, 210), a top keel 137, and an S-inlet 139.

The duct 132 may be a bifurcated duct inlet 132A or the like to maintain a constant top keel 137. The gas-powered turbofan 210 may be disposed behind the bifurcated duct inlet 132A for greater performance and efficiency. The top keel 137 may be split and/or divided. The S-inlet 139 is routed over and through the top keel 137 and is utilized for cruising and a lift engine. The S-inlet 139 is more ideal for this, due to lower possibility of back pressure, foreign object debris or FOD and more efficient cruise ram air effect.

Figure 3A:
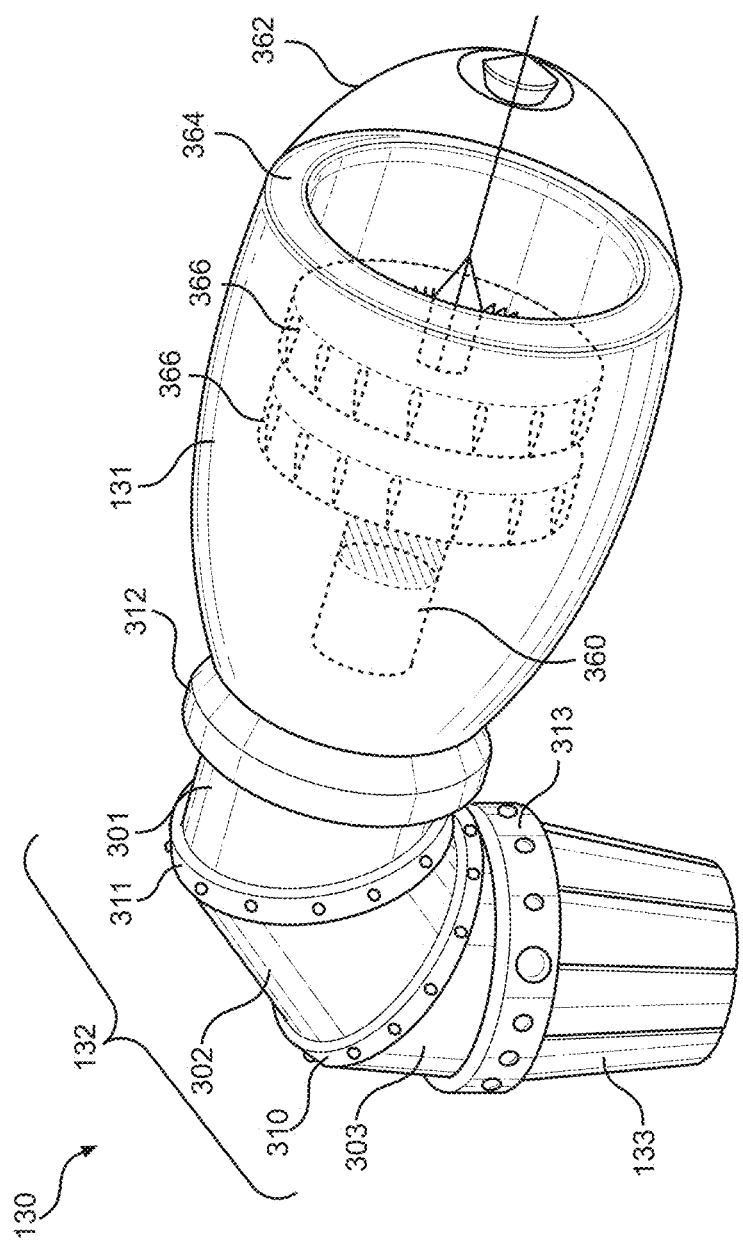
FIG. 3A shows a first side perspective view of an adjustably mounted turbine in an embodiment of the vertical take-off and landing aircraft.

Referring now to FIG. 3A there is shown a side perspective view of an adjustably mounted turbine 133 and the vertical take-off and landing aircraft 100 in an embodiment of the vertical take-off and landing aircraft 100. In the shown embodiment, the adjustably mounted turbine 130 may comprise a statically mounted fan pod 131, a duct 132 may be rotatably connected to the fan pod 131, and an adjustable nozzle 133 may be rotatably connected to the duct 132. Thrust may be generated by the adjustably mounted turbine 130 by the rapid movement of air through the fan pod 131 into the duct 132 and out of the adjustable nozzle 133. One of ordinary skill in the art will understand how a fan pod 131 and the adjustably mounted turbine 130 may be utilized to generate thrust necessary for flight.

The fan pod 131 may include a plurality of single shaft propellers or a plurality of contra rotating propellers (both not shown) that may rotate in tandem.

The adjustable nozzle 133 may be configured to be adjusted between a vertical position, wherein the adjustable nozzle 133 may be perpendicular to the associated wing, and a horizontal position, wherein the adjustable nozzle 133 is parallel to the associated wing, via the duct 132. In this manner, the thrust generated by the adjustably mounted turbine 130 may be vectored between a horizontal thrust and a vertical thrust. The horizontal thrust may be utilized in the ordinary manner in concert with the wings to provide lift and flight. The vertical thrust may be utilized to project the aircraft into the air in a vertical manner by projecting the flow of air downwards. Angular thrust may also be attained by moving the adjustably mounted turbine 130 to various configurations between the vertical and horizontal configurations. In some embodiments, lateral thrust may be achieved via the use of a bleed air outlet (as shown in FIG. 3C, 350) powered by a servo, wherein the bleed air outlet may be disposed on an outboard side of the adjustable nozzle 133, as further detailed below.

In the shown embodiment, the duct 132 may comprise three segments; a front segment 301, a middle segment 302, and a rear segment 303, wherein the front segment 301 may be rotatably fastened to the middle segment 302, and the middle segment 302 may be rotatably fastened to the rear segment 303. In this manner, the three segments 301, 302, 303 may rotate relative to each other in order to position the duct 132 in a horizontal configuration (as shown in dashed lines in FIG. 4A), a vertical position as shown, and a variety of configurations in between. In the shown embodiment, an electric axle motor may be utilized to control the orientations of the segments 301, 302, 303 of the ducts in order to control the orientation of the nozzle 133. The segments 301, 302, 303 may be slidably secured to one another via a pair of fasteners 310, 311 Similarly, segment 303 may be slidably secured to the nozzle 133 via a nozzle fastener 313 and segment 301 may be slidably secured to the fan pod 131 via a fan pod fastener 312. The duct 132 may be a bifurcated duct or the like. The pair of fasteners 310, 311 and the nozzle fastener 313 may be flush head fasteners and may be made of metallic material, composite material, or the like. There is also a tray or pan or the like that contains the longerons 117.

There may also be a pair of electric engines 360, a diaphragm 362, an anti-icing heater 364, and a plurality of single shaft counter rotating propellers 366.

The pair of electric engines 360 may provide electric power to the adjustably mounted turbine 130. The diaphragm 362 may manage and compress air coming into the adjustably mounted turbine 130 and are also known as stator vanes or guide vanes. The anti-icing heater 364 may prevent ice from forming on the lip 130A of the adjustably mounted turbine 130. The single shaft counter rotating propellers 366 may be powered by the pair of electric engines 360 and rotate in tandem with each other.

Referring to FIG. 3AA there is shown a side perspective view of an embodiment of the vertical take-off and landing aircraft 100.

The vertical take-off and landing aircraft 100 may include a raised tail 370, a trailing-link landing gear (FIG. 1, 112), a pair of doors 372, and a pair of door panels 374.

The raised tail 370 may result in increased space for a relatively larger engine, for accommodating relatively more equipment, to shield against downwash, to allow for a hot start, for improved passage for exhaust nozzle, for relative low cabin noise reduction, for additional protection from exhaust and foreign objects from tailskid strikes and improved and increased rotation angle and directional control and the like. The increased space may result in an increased fuselage length of approximately 46.8 inches and an increased fuselage height of approximately 6 inches or the like.

The trailing-link landing gear 112 may have a rotation angle of approximately 15 degrees or the like to improve shock absorption and cushioning of the vertical take-off and landing aircraft 100.

The pair of doors 372 may include a passenger door 372A and a cargo door 372B, wherein the cargo door 372B may be relatively larger than the passenger door 372A and the passenger door 372A and the cargo door 372B may share a door frame 372C. The cargo door 372B may include the pair of panels 374 disposed on the cargo door 372B to rotate up to open and to rotate down to close.

The pair of panels 374 may operate individually or simultaneously by a manual cranking actuator or a powered actuator (both not shown) or the like. The pair of panels 374 both must be locked manually to illuminate a green light (not shown) both on the ground and inside the flightdeck. In high wind conditions, the pair of panels 374 should be operated one panel at a time or inside a hangar.

The passenger door 372A may arch up and down with its own unfolding and folding (not shown) airstairs. When a locked green light illuminates and a red-light extinguishes, none of the pair of doors 372 will open without the initial inside movement. One or more cams 372D may be disposed on each of the pair of doors 372 for safety or the like. However, since the vertical take-off and landing aircraft 100 is a vertical take-off and landing or VTOL aircraft, a plurality of pressure/landing gear olio sensors 372E will relieve cabin pressure or a guarded red cover switch (not show) on the flightdeck may override other sensors.

In anticipation of heavy turbulence weather, for safety, differential pressure will be lowered to the Federal Aviation Administration or FAA minimum allowable for an approximate 35,000 ft. altitude or the like.

In an aerial lift and drop off, a plurality of hard points (not shown) may be attached to the floor of the fuselage (not show) between the lateral floor ribs. The attachments points may protrude from the belly of the fuselage and may be concentrated around a center of gravity or CG area and a canard configuration. The canard hard configuration points will maintain the load on the vertical take-off and landing aircraft 100 stable during trips and will also assist with a belly pan or the like, if assembled.

Figure 3B:
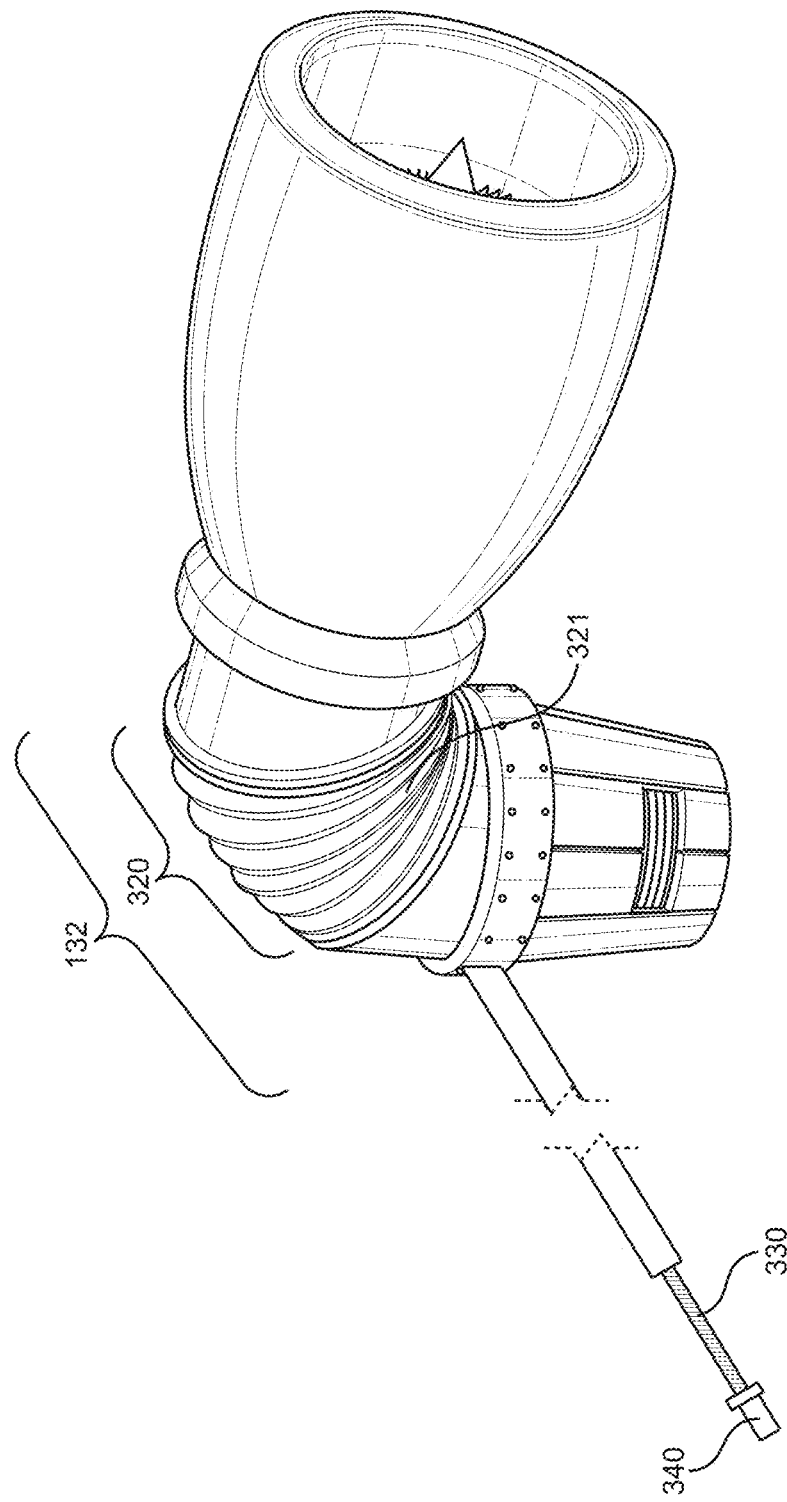
FIG. 3B shows a second side perspective view of an adjustably mounted turbine in an alternate embodiment of the vertical take-off and landing aircraft.
Figure 3C:
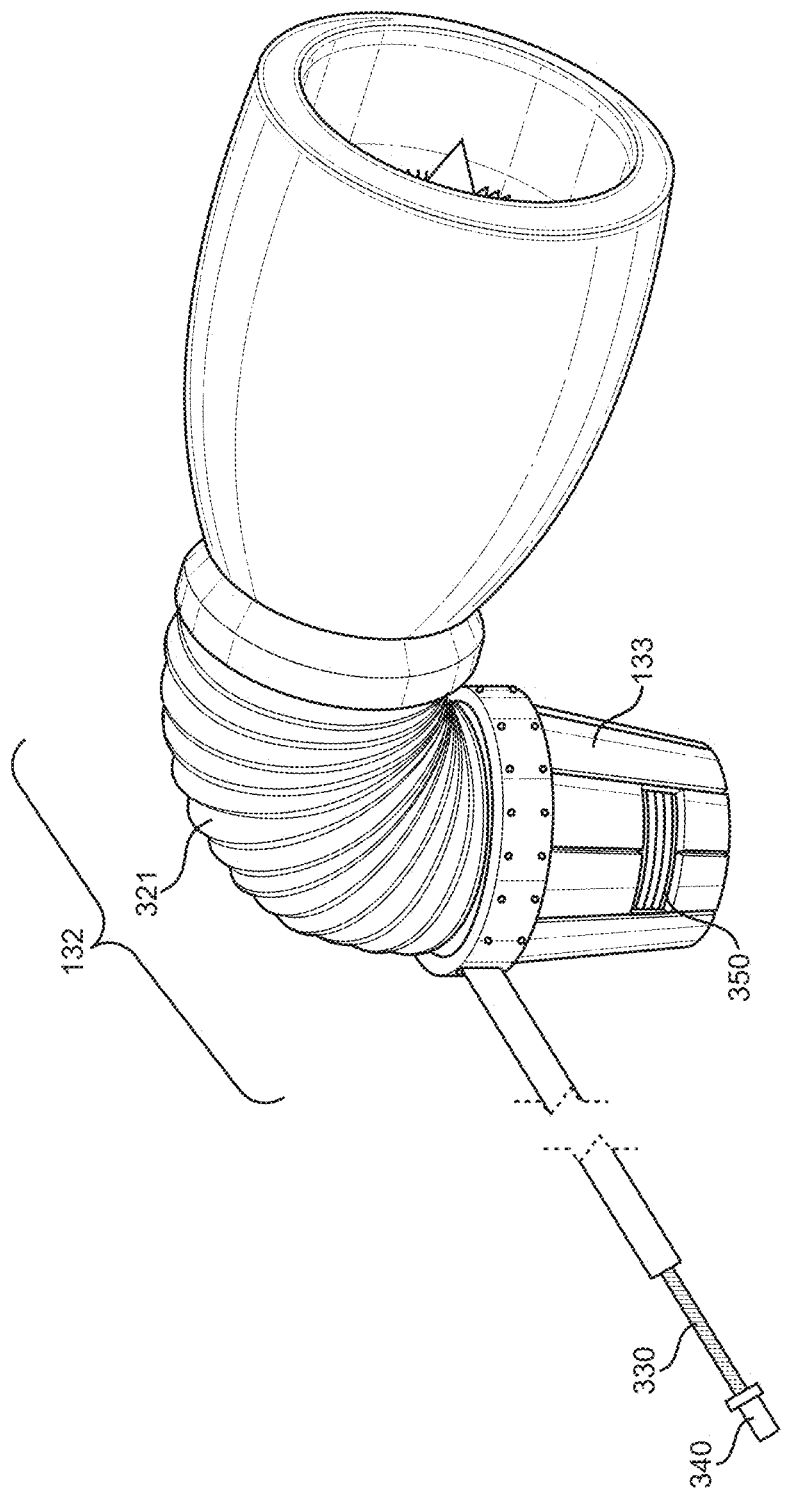
FIG. 3C shows a third side perspective view of an adjustably mounted turbine in an alternate embodiment of the vertical take-off and landing aircraft.

Referring now to FIG. 3B there is shown a side perspective view of an adjustably mounted turbine 320 in an alternate embodiment of the vertical take-off and landing aircraft 100, wherein a portion of a duct 132 of the adjustably mounted turbine 320 includes a plurality of bellows 321. In one embodiment, a middle portion 320 of the duct 132 comprises the bellows 321. In the shown embodiment, the middle portion 320 is the middle segment identified in FIG. 3A above. The bellows 321 may be configured to compress and expand in an accordion-style manner. The bellows 321 may perform the function of moving the nozzle 133 between a horizontal and vertical configuration, similar to how the axle motor may control the orientations of the segments 301, 302, 303 of the ducts in order to control the orientation of the nozzle 133, as discussed above. The bellows 321 may be capable of movement in a vertical axis when forced but may also deflect in a lateral axis to a limited degree. In one embodiment, the bellows 321 may be a sewn composite bellowed liner or the like.

The adjustable nozzle 133 may be connected to an adjustable turnbuckle 330 and a push rod 340, which in turn may be attached to a linear actuator. The linear actuator may move the push rod 340 which in turn may move the adjustable nozzle 133. In this manner, the linear actuator may be utilized to compress and expand the bellows 321 in order to move the adjustable nozzle 133 between a horizontal and vertical configuration.

Referring now to FIG. 3C, there is shown a side perspective view of an adjustably mounted turbine in an alternate embodiment of the vertical take-off and landing aircraft, wherein an entirety of a duct of the adjustably mounted turbine includes a plurality of bellows.

In the shown embodiment, an entire length of the duct 132 may comprise a plurality of bellows 321. By providing various configurations of the duct 132 with different portions thereof comprising the bellows 321, different levels of rigidity and flexibility may be attained in the duct 132. For example, in the embodiment shown in FIG. 3A, the duct 132 does not include the bellows 321 and each segment 301, 302, 303 of the duct 132 is rigid and each segment 301, 302, 303 of the duct 132 rotates to provide the horizontal and vertical configurations. In contrast, the embodiment shown in FIG. 3B, a portion of the duct 132 includes a plurality of bellows 321, which provides for greater flexibility and movement profiles while maintained the rigid characteristics of the front segment 301 and the rear segment 302. Finally, in the shown embodiment, the entire length of the duct 132 may comprise a plurality of bellows 321, thereby providing the greatest amount of flexibility to the duct 132. By utilization of the linear actuator to move the push rod 340 and the adjustable turnbuckle 330, the entire length of the duct 132 may be expanded, compressed, or moved to any configuration allowed by the function of the bellows 321.

In the shown embodiment (as well as the embodiment shown in FIG. 3B), the adjustable nozzle 133 further may comprise a bleed air outlet 350 disposed on an outboard side of the adjustable nozzle 133. The bleed air outlet 350 may be powered by its own servo and is used to augment lateral stability. In another use, the bleed air outlet 350 may be utilized as a damper. One of ordinary skill in the art will understand how directing a portion of the flow of air through the bleed air outlet 350 may provide additional lateral stability. The additional lateral stability may be desirable in situations such as precision pinpoint landings on a roof top in heavy cross winds and low visibility.

Figure 4A:
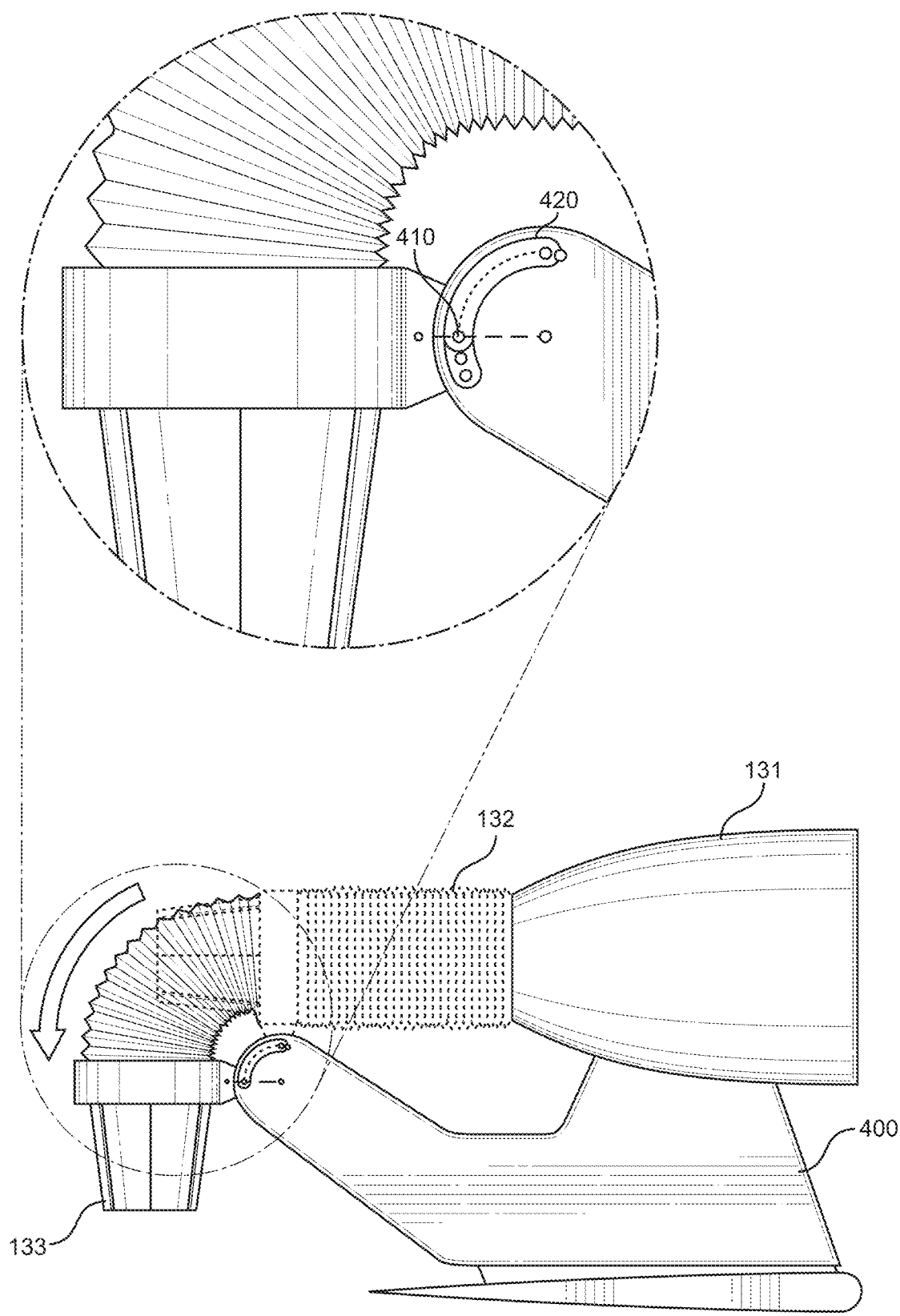
FIG. 4A shows a perspective view of an adjustably mounted turbine in an embodiment of the vertical take-off and landing aircraft with a focus on an over-the-wing mounting bracket.

Referring now to FIG. 4A, there is shown a perspective view of an adjustably mounted turbine in an embodiment of the vertical take-off and landing aircraft 400 with a focus on an over-the-wing mounting bracket.

In the shown embodiment, each of the fan pods 131 may be permanently and statically mounted to the wing via a mounting bracket 400. Further, in the shown embodiment, the mounting bracket 400 may be mounted to a top surface of the wing. The mounting bracket 400 may assure that the fan pod 131 is statically disposed on the wing. In this manner, the aerodynamics of the wing may not be constantly changing as the fan pod 131 moves from one position to another. Some other devices present in the art provide for fan pods 131 that are integrated into the wing or the fuselage. These fan pods 131 rotate within their housings and affect the aerodynamic characteristics of the wing. In some instances, the rotation of the fan pod 131 in their housing creates a large amount of drag and in other cases creates a cross-current of airflow around the wing. The present invention may eliminate this drag and cross-current of airflow by directing the flow of air from the fan pod 131 through the duct 132 and out the nozzle 133, wherein the nozzle may be disposed behind the wing on which the fan pod 131 and mounting bracket 400 may be attached. By vectoring the airflow behind the wing, the aerodynamic properties of the wing may be unaffected by the airflow through the adjustably mounted turbine.

In one embodiment, the nozzle 133 may be slidably mounted to the mounting bracket 400. In a further embodiment, the nozzle 133 may travel along a channel 420 in the mounting bracket 400. In the shown embodiment, the channel 420 may be semicircular in order to enable the nozzle 133 to move between a horizontal configuration and a vertical configuration. The channel 420 may be disposed on a rear portion of the mounting bracket 400 such that the distance between a point of connection between mounting bracket 400 and the nozzle 133 may be minimized. The channel 400 may also be disposed on a portion of the mounting bracket 400 that is beyond and behind the wing in order to maintain the aerodynamic properties of the wing and prevent interference of the motion of the nozzle 133 by colliding with the wing. In the shown embodiment, the duct 132 may entirely be a plurality of a bellows 321, and movement of the linear actuator 410 between extreme ends of the channel 420 may fully compress and fully extend the bellows 321 and the duct 132. The linear actuator 410 may allow some reverse thrust for minor correction in the event of adjustment for "aiming out". The linear actuator 410 may also compensate for idle from the engine from gas engine thrust.

Figure 4B:
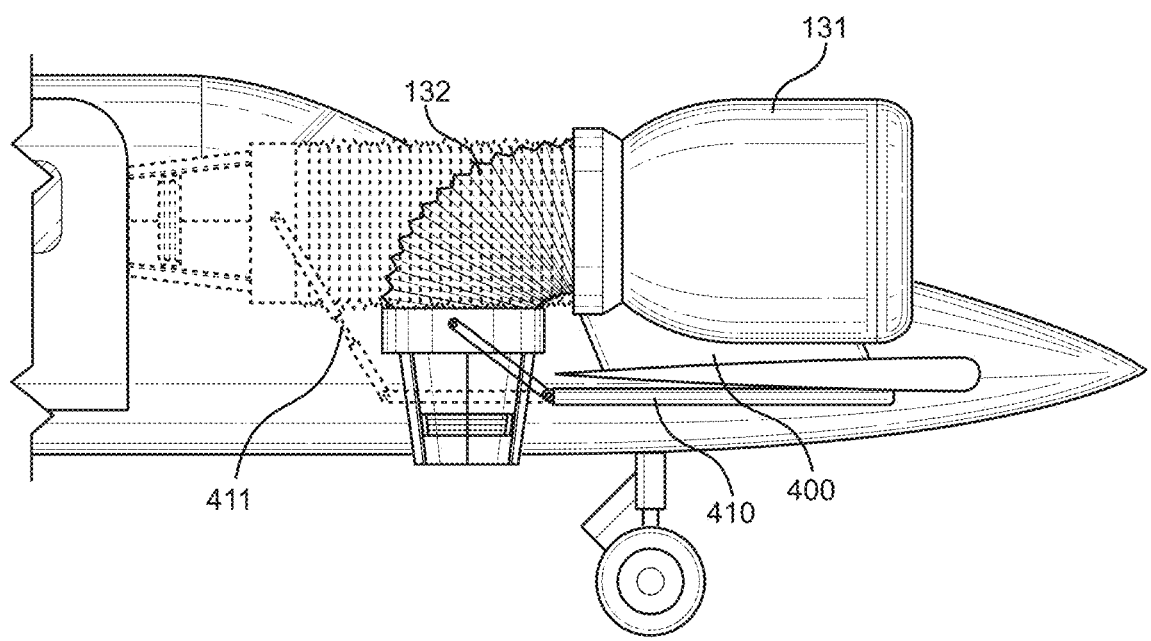
FIG. 4B shows a perspective view of an adjustably mounted turbine in an alternate embodiment of the vertical take-off and landing aircraft with an under-the-wing linear actuator.

Referring now to FIG. 4B, there is shown a perspective view of an adjustably mounted turbine in an alternate embodiment of the vertical take-off and landing aircraft 100 with a focus on an under-the-wing linear actuator.

In the shown embodiment, the fan pod 131 may be permanently and statically mounted to the wing via the mounting bracket 400. Unlike the embodiment shown in FIG. 4A, in the shown embodiment the mounting bracket 400 may not comprise a portion that extends beyond and behind the wing and does not include a channel. Instead, in the shown embodiment, the linear actuator 410 may be mounted below the wing. The linear actuator 410 may be connected to an exterior surface of the nozzle 133. In this manner, when the linear actuator 410 moves back and forth, the connected nozzle 133 moves with it. In the shown embodiment, the linear actuator 410 may comprise a telescopic portion 411. The telescopic portion 411 may enable a length of the linear actuator 410 to be shorter when the duct 132 is in the vertical position, and the length of the linear actuator 410 to be longer when the duct 132 is in the horizontal position. In the shown embodiment, the duct 132 may be entirely a plurality of bellows 321 and the linear actuator 410 enables the bellows 321 to compress, expand, and move from a vertical to a horizontal configuration. In other embodiments, the duct 132 may include a partial bellows (as shown in FIG. 3B) and may comprise three static segments (as shown in FIG. 3A). In such embodiments, the linear actuator 410 may provide a backup to the motor which allows such segments to rotate relative to each other. Thus, the presence and use of the linear actuator 410 may provide a redundancy such that in the event that the motor fails, the linear actuator 410 may be used to rotate the segments between a horizontal and vertical configuration.

Figure 4C:
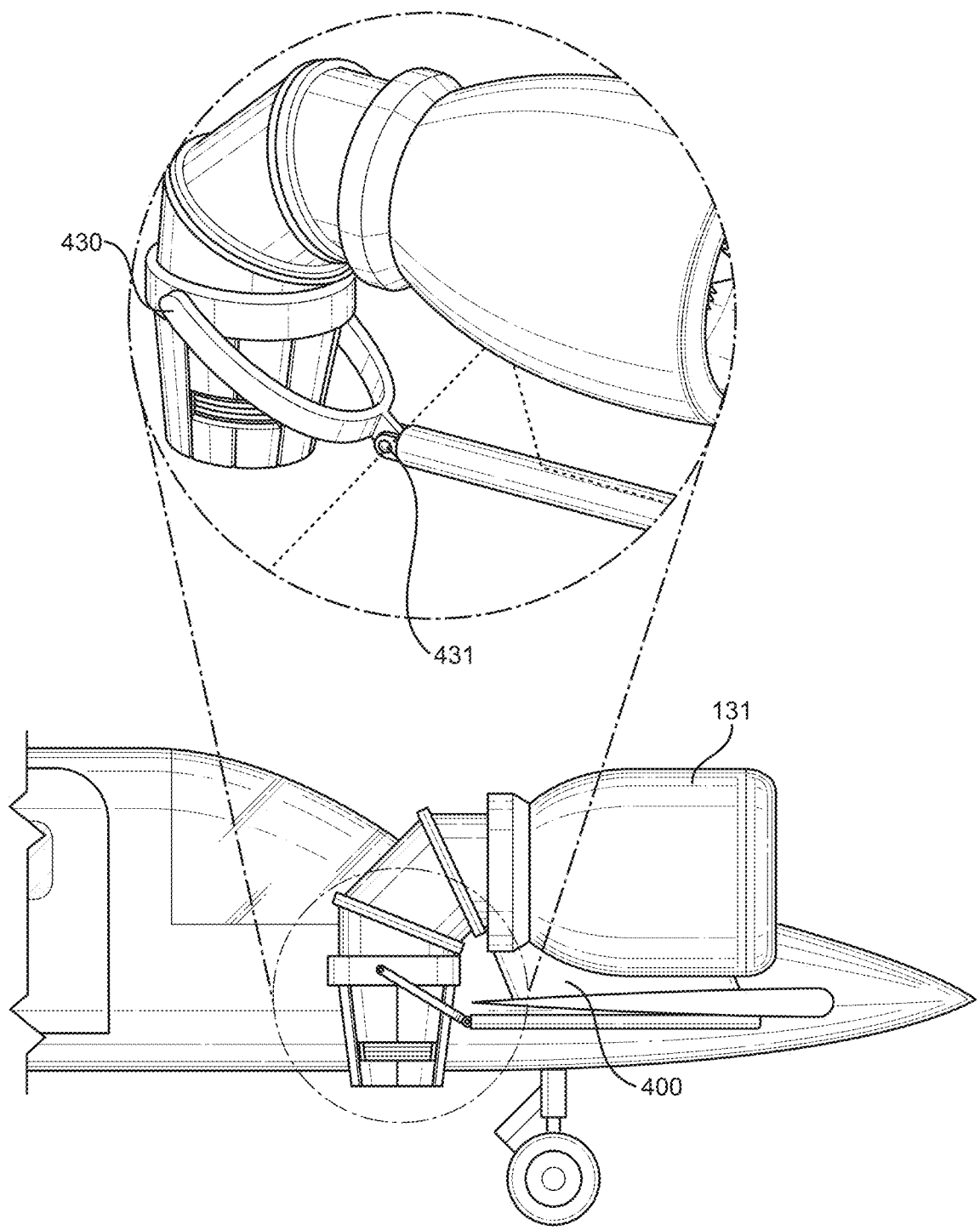
FIG. 4C shows a side view of an adjustably mounted turbine in an alternate embodiment of the vertical take-off and landing aircraft with a focus on a wishbone-shaped actuator.

Referring now to FIG. 4C, there is shown a side view of an adjustably mounted turbine in an alternate embodiment of the vertical take-off and landing aircraft 100 with a focus on a wishbone-shaped actuator. Similar to the embodiment shown in FIG. 4B, in the shown embodiment the fan pod 131 may be permanently and statically mounted to the mounting bracket 400, the mounting bracket 400 may be in turn mounted to a top surface of the wing. The mounting bracket 400 may not comprise a portion that extends beyond and behind the wing and does not include a channel. Instead, in the shown embodiment, the linear actuator 410 may be mounted below the wing. In the shown embodiment, the linear actuator 410 may be connected to an exterior surface of the nozzle 133 via a wishbone-shaped telescopic actuator 430. In the shown embodiment, the wishbone-shaped telescopic actuator 430 may comprise a linear actuator 410 hingedly connected to a semi-circular attachment member. The semi-circular attachment member may enable the wishbone-shaped telescopic actuator 430 to attach to opposing external surfaces of the nozzle 133. Further, as the linear actuator 410 may be hingedly connected to the semi-circular attachment member in the wishbone-shaped telescopic actuator 430 and the semicircular attachment member may rotate as needed when the linear actuator 410 moves. A depth of curvature of the semicircular attachment member is large enough such that when the wishbone-shaped telescopic actuator 430 may rotate to a position below the nozzle 133, the nozzle 133 may not impede the movement of the wishbone-shaped telescopic actuator 430. Thus, the wishbone-shaped telescopic actuator 430 may freely rotate about and below the nozzle 133.

Figure 5:
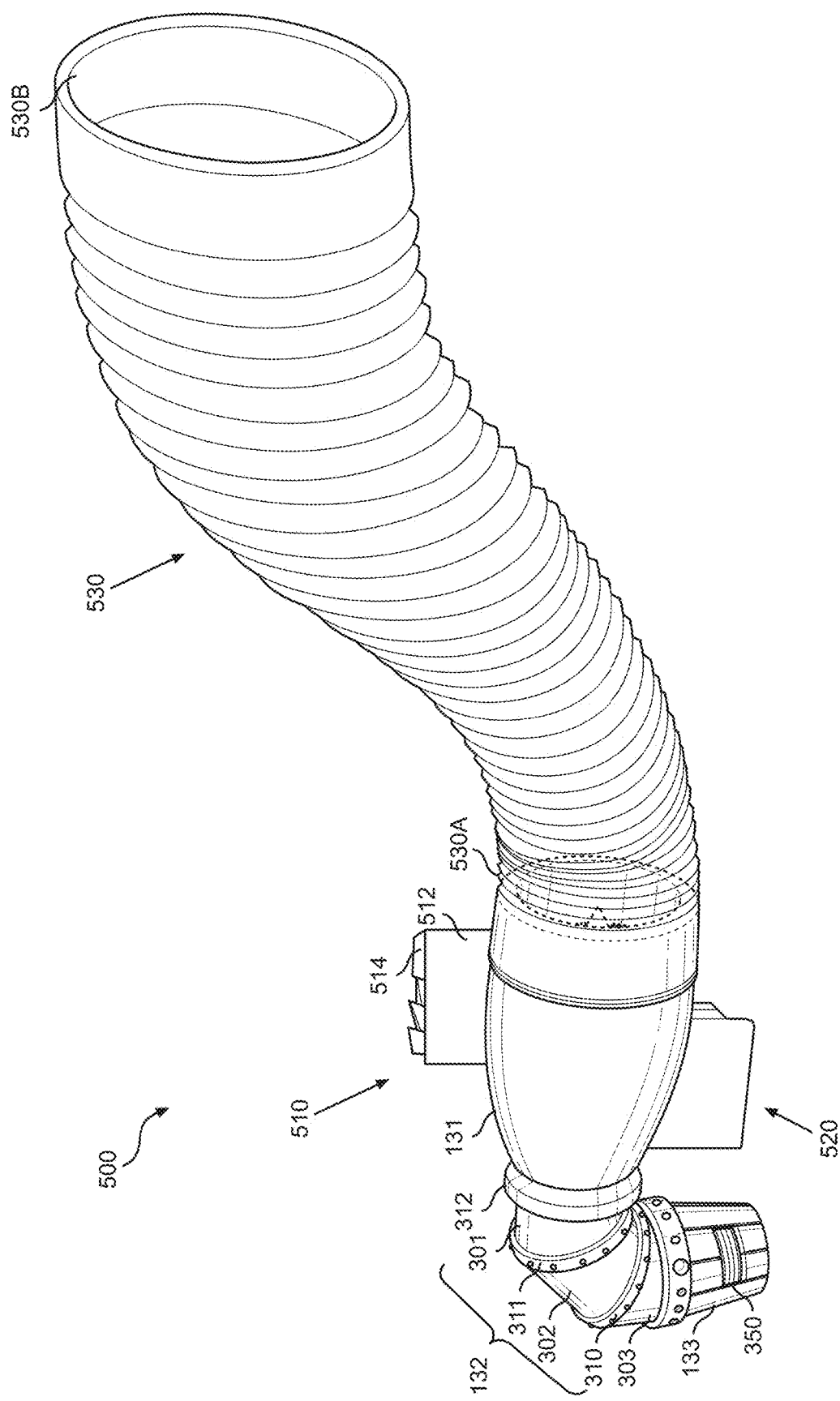
FIG. 5 shows a second side perspective view of an adjustably mounted turbine in an embodiment of the vertical take-off and landing aircraft.

FIG. 5 shows a side perspective view of an adjustably mounted turbine 130 in an alternate embodiment of the vertical take-off and landing aircraft 500.

The vertical take-off and landing aircraft 500 may include an exhaust vent 510, a support base 520, and a turbine extension 530.

The exhaust vent 510 may include a base 512 and a plurality of exhaust pipes 514. The base 512 may be disposed on top of the adjustably mounted turbine 130. The exhaust pipes 514 may extend down through the base 512 and into the adjustably mounted turbine 130. FIG. 5 shows 4 exhaust pipes 514, but there may be any suitable number of exhaust pipes 514 or the like. The exhaust pipes 514 may help expel gases and the like from the adjustably mounted turbine 130.

The support base 520 may be disposed underneath the adjustably mounted turbine 130. The support base 520 may be disposed on the fuselage 110 or the like and is fitted to support the bottom of the adjustably mounted turbine 130.

The turbine extension 530 may be coupled to the front of the adjustably mounted turbine 130. The turbine extension 530 may extend upward and outward from the adjustably mounted turbine 130 to expel gases or the like away from the adjustably mounted turbine 130. The turbine extension 530 may have a proximal end 530A that is relatively wider than a distal end 530B to expel gases and the like up and out from the adjustably mounted turbine 130.

Figure 6:
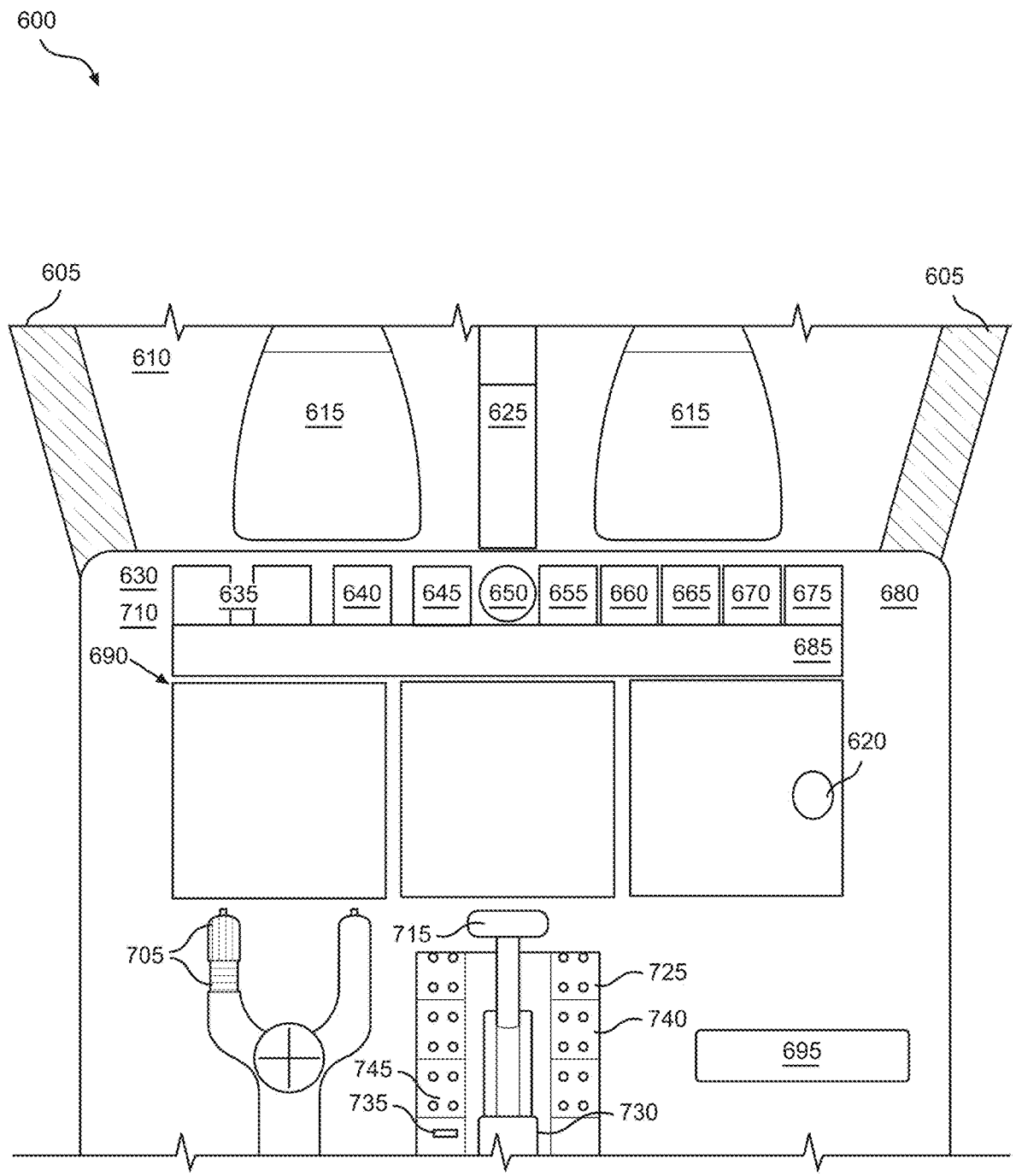
FIG. 6 shows a side perspective view of an adjustably mounted turbine and an accessory in an alternate embodiment of the vertical take-off and landing aircraft.

FIG. 6 shows an overhead view of an alternate embodiment of the vertical take-off and landing aircraft 600. More specifically, the vertical take-off and landing aircraft 600 may provide for a high performance aircraft capable of vertical and horizontal flights.

The vertical take-off and landing aircraft 600 may include a plurality of longerons 605, a windshield 610, a pair of displays 615, a processor 620, a keel 625, a plurality of manual flight controls 630, a plurality of electric motor flight controls 635, a plurality of gasoline motor flight controls 640, a plurality of electric motor or gasoline motor flight controls 645, a plurality of instrumentation controls 650, a plurality of auto hover controls 655, a loiter system 660, a plurality of landing gear 665, a ground power source 670, a battery sensor 675, a plurality of test systems 680, a lower glare shield 685, a plurality of multi-functional screens and panels 690, and a passenger and pilot yoke 695.

The vertical take-off and landing aircraft 600 may also include a plurality of ratcheted fan pods 705, an on the ground rudder 710, a gas engine start 715, a plurality of elevator trim 720, a radio switch 725, a gas engine fire shut-off lever 730, a rudder trim 735, a ratcheted grip twist 740, and a gas engine throttle and nozzle lever 745.

The longerons 605 may be made of metallic material, composite material or the like. The windshield 610 may be a flat, multiple layer, made of sheets of solid transparent, resinous material to be used as a glass substitute or PLEXIGLASS®. The pair of displays 615 may each operate autonomously and may enable to takeoff, land, and navigate the vertical take-off and landing aircraft 600 vertically or horizontally. The processor 620 may include a non-transitory storage media 622 that controls the operation of the vertical take-off and landing aircraft 600. The keel 625 may be made of metallic material, composite material or the like. The manual flight controls 630 may include a stick and rudder 632 and a red activation button 634 with a cover 636 with use of only a gasoline engine. The electric motor flight controls 635 may include a framed touch display and an green activation button 637 with use of only an electric engine. The gasoline motor flight controls 640 may include a framed touchscreen and a blue activation button or switch 642 with use of only a gasoline engine. The electric motor or gasoline motor flight controls 645 may include a framed touchscreen and a blue activation button or switch 647 with use of only a gasoline engine and/or an electric engine. The instrumentation controls 650 may include a hackproof gyroscope and mechanical compass 652. The auto hover controls 655 may only be used in combination with an electric engine. The loiter system 660 may allow for selecting a power source such as a manual power source, an electric power source, or a gasoline power source. The landing gear 665 may be controlled to safely land the vertical take-off and landing aircraft 600. The ground power source 670 may provide electric power for air conditioning and lighting. The battery sensor 675 may indicate the power level of the batteries and the electric engine. The test systems 680 may include a first flight of the day check and other critical checks with less critical checks being self-checking. The lower glare shield 685 may include controls for vertical and horizontal movement, for cruise control, for heading and tracking information, for a Global Positioning System or GPS, for control of the vertical take-off and landing aircraft battery, for one or more gyroscopes, a magnetic compass, and a plurality of pressurization knobs. The multi-functional screens and panels 690 may include the pair of displays 615 that may include a first display 615A and a second display 615B each having 3 flat panel sub-displays 692 that are each approximately 16 inches diagonally that may provide a plurality of flight information. The passenger and pilot yoke 695 may include a 3-axis, automatic/manual control with a microphone with a boom mic when wearing an oxygen mask, a cabin announcement, an elevator trim 720, and some avionics.

The ratcheted fan pods 705 may be used for ground maneuvering. The on the ground rudder 710 may also double as a nose wheel steering 712. The gas engine start 715 may start the gasoline engine or the like. The elevator trim 720 may be disposed on both sides of each of the pair of elevators 135. The radio switch 725 may activate, shut-off, or adjust any radios or the like. The gas engine fire shut-off lever 730 may allow shutting off fuel to an engine during a fire or explosion. The rudder trim 735 may allow for relatively small adjustments to the rudder of the vertical take-off and landing aircraft. The ratcheted grip twist 740 may be used for on the ground steering and the like. The gas engine throttle and nozzle lever 745 may control power to the vertical take-off and landing aircraft 600.

Use of the vertical take-off and landing aircraft 100 is relatively complex. The vertical take-off and landing aircraft 100 may be capable of vertical and horizontal flights. In order to safely utilize the vertical take-off and landing aircraft 100, a well proven fly-by-wire system is a primary system followed by a conventional mechanical system as a backup may be factored in. The vertical take-off and landing aircraft 100 relatively complex operation may include an electric vertical flight only operation, an electric and/or horizontal flight gas operation, a horizontal flight conventional operation, and a mechanical flight operation.

The vertical take-off and landing aircraft 100 may include emergency landing or ditching based on a glide ratio of approximately 11:1. For example, at approximately 10,000 feet, a person may glide approximately 10,000 feet x approximately 11:1 or approximately 110,000 feet or approximately 20 statue miles. Selectors may be horizontally located just below the glare shield and may allow configuration change in a minimum time. The vertical take-off and landing aircraft 100 may include a display that is approximately 16 inches in diameter or the like.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vertical take-off and landing aircraft, comprising:
a fuselage including a nose end and a tail end;
wherein the fuselage comprising a plurality of seats disposed in an interior volume of the fuselage;
wherein the fuselage further comprising a cockpit disposed at a front end of the interior volume of the fuselage;
a pair of rear wings extending outwardly from opposing sides of the fuselage between the cockpit and the tail end;
each rear wing of the pair of rear wings comprising an aileron;
a pair of front wings extending outwardly from opposing sides of the fuselage between the cockpit and the nose end;
each front wing of the pair of front wings comprising an elevator;
wherein each of the pair of rear wings and each of the pair of front wings includes an adjustably mounted turbine;
wherein each adjustable mounted turbine is disposed on a top surface of each of the pairs of rear wings and each of the pair of front wings;
wherein the adjustably mounted turbine comprising a statically mounted fan pod, a duct rotatably connected to the fan pod, and an adjustable nozzle rotatably connected to the duct;
wherein the duct is rotatable between at least a horizontal configuration, a vertical position, and a plurality of intermediate positions;
wherein the horizontal configuration is defined where the adjustable nozzle is parallel to the associated wing and horizontal thrust is generated;
wherein the vertical position is defined where the adjustable nozzle is perpendicular to the associated wing and vertical thrust is generated; and
wherein the statically mounted fan pods are defined entirely above a corresponding wing;
further comprising an exhaust vent and a support base disposed on the adjustably mounted turbine.

2. The vertical take-off and landing aircraft of claim 1, wherein each of the statically mounted fan pods are permanently mounted to a top surface of the wing via a mounting bracket, wherein the mounting bracket defines a gap between the statically mounted fan pod and the wing.

3. The vertical take-off and landing aircraft of claim 1, wherein the duct comprises a bifurcated duct inlet having a front segment, a middle segment, and a rear segment, wherein the front segment is rotatably fastened to the middle segment, and the middle segment is in turn rotatably fastened to the rear segment.

4. The vertical take-off and landing aircraft of claim 1, wherein the adjustable nozzle is connected to a wishbone-shaped telescopic actuator.

5. The vertical take-off and landing aircraft of claim 1, wherein the adjustable nozzle further comprises a bleed air outlet powered by a servo, wherein the bleed air outlet is disposed on an outboard side of the adjustable nozzle.

6. The vertical take-off and landing aircraft of claim 1, wherein each of the statically mounted fan pods are powered by two electric motors in tandem.

7. The vertical take-off and landing aircraft of claim 1, wherein the fuselage is in a canard configuration.

8. The vertical take-off and landing aircraft of claim 1, wherein the exhaust vent includes a base and a plurality of exhaust pipes and the base is disposed on top of the adjustably mounted turbine.

9. The vertical take-off and landing aircraft of claim 1, wherein the adjustable nozzle is connected to an adjustable turnbuckle and a push rod attached to a linear actuator, wherein the linear actuator is configured to move the adjustable nozzle between the horizontal configuration and the vertical position.

10. The vertical take-off and landing aircraft of claim 9, wherein the adjustable nozzle is slidably mounted to the mounting bracket.

11. The vertical take-off and landing aircraft of claim 10, wherein the adjustable nozzle is slidable via movement of the linear actuator along a channel defined within the mounting bracket.

12. A vertical take-off and landing aircraft, comprising:
a fuselage including a nose end and a tail end;
wherein the fuselage comprising a plurality of seats disposed in an interior volume of the fuselage;
wherein the fuselage further comprising a cockpit disposed at a front end of the interior volume of the fuselage;
a pair of rear wings extending outwardly from opposing sides of the fuselage between the cockpit and the tail end;
each rear wing of the pair of rear wings comprising an aileron;
a pair of front wings extending outwardly from opposing sides of the fuselage between the cockpit and the nose end;
each front wing of the pair of front wings comprising an elevator;
wherein each of the pair of rear wings and each of the pair of front wings includes an adjustably mounted turbine;
wherein each adjustable mounted turbine is disposed on a top surface of each of the pairs of rear wings and each of the pair of front wings;
wherein the adjustably mounted turbine comprising a statically mounted fan pod, a duct rotatably connected to the fan pod, and an adjustable nozzle rotatably connected to the duct;
wherein the duct comprises a front segment, a middle segment, and a rear segment;
wherein the front segment is rotatably fastened to the middle segment, and the middle segment is in turn rotatably fastened to the rear segment;
wherein the duct is a bifurcated duct inlet being rotatable between at least a horizontal configuration, a vertical position, and a plurality of intermediate positions;
wherein the horizontal configuration is defined where the adjustable nozzle is parallel to the associated wing and horizontal thrust is generated;
wherein the vertical position is defined where the adjustable nozzle is perpendicular to the associated wing and vertical thrust is generated;
wherein the statically mounted fan pods are defined entirely above a corresponding wing;
wherein each of the statically mounted fan pods are permanently mounted to a top surface of the wing via a mounting bracket;
wherein the mounting bracket defines a gap between the statically mounted fan pod and the wing;
further comprising an exhaust vent and a support base disposed on the adjustably mounted turbine;
further comprising a gas engine fire shut-off lever to allow shutting off fuel to an engine during a fire or explosion; and
further comprising a raised tail, a trailing-link landing gear, a pair of doors, and a pair of door panels.

13. The vertical take-off and landing aircraft of claim 12, wherein the adjustable nozzle is connected to an adjustable turnbuckle and a push rod attached to a linear actuator, wherein the linear actuator is configured to move the adjustable nozzle between the horizontal configuration and the vertical position.

14. The vertical take-off and landing aircraft of claim 12, wherein the exhaust vent includes a base and a plurality of exhaust pipes.

15. The vertical take-off and landing aircraft of claim 13, wherein the base is disposed on top of the adjustably mounted turbine and the support base is disposed underneath the adjustably mounted turbine and is fitted to support the bottom of the adjustably mounted turbine.

16. The vertical take-off and landing aircraft of claim 12, wherein the adjustable nozzle is connected to a wishbone-shaped telescopic actuator.

17. The vertical take-off and landing aircraft of claim 16, wherein the adjustable nozzle further comprises a bleed air outlet powered by a servo, wherein the bleed air outlet is disposed on an outboard side of the adjustable nozzle.

18. A vertical take-off and landing aircraft, comprising:
a fuselage including a nose end and a tail end;
wherein the fuselage comprising a plurality of seats disposed in an interior volume of the fuselage;
wherein the fuselage further comprising a cockpit disposed at a front end of the interior volume of the fuselage;
a pair of rear wings extending outwardly from opposing sides of the fuselage between the cockpit and the tail end;
each rear wing of the pair of rear wings comprising an aileron;
a pair of front wings extending outwardly from opposing sides of the fuselage between the cockpit and the nose end;
each front wing of the pair of front wings comprising an elevator;
wherein each of the pair of rear wings and each of the pair of front wings includes an adjustably mounted turbine;
wherein each adjustable mounted turbine is disposed on a top surface of each of the pairs of rear wings and each of the pair of front wings;
wherein the adjustably mounted turbine comprising a statically mounted fan pod, a duct rotatably connected to the fan pod, and an adjustable nozzle rotatably connected to the duct;
wherein the duct is rotatable between at least a horizontal configuration, a vertical position, and a plurality of intermediate positions and is a bifurcated duct;
wherein the horizontal configuration is defined where the adjustable nozzle is parallel to the associated wing and horizontal thrust is generated;
wherein the vertical position is defined where the adjustable nozzle is perpendicular to the associated wing and vertical thrust is generated;
wherein the statically mounted fan pods are defined entirely above a corresponding wing;
wherein the adjustable nozzle is connected to an adjustable turnbuckle and a push rod attached to a linear actuator;
a gas-powered turbofan disposed in the rear portion of the fuselage, the gas-powered turbofan configured to power onboard electronic devices;
further comprising an exhaust vent and a support base disposed on the adjustably mounted turbine;
wherein the exhaust vent includes a base and a plurality of exhaust pipes and the base is disposed on top of the adjustably mounted turbine;
wherein the base is disposed on top of the adjustably mounted turbine and the support base is disposed underneath the adjustably mounted turbine and is fitted to support the bottom of the adjustably mounted turbine;
further comprising a gas engine fire shut-off lever to allow shutting off fuel to an engine during a fire or explosion;
further comprising a rudder trim that allows for adjustments to a rudder of the vertical take-off and landing aircraft;

wherein the exhaust pipes extend down through the base and into the adjustably mounted turbine to help expel gases from the adjustably mounted turbine;
further comprising a raised tail, a trailing-link landing gear, a pair of doors, and a pair of door panels;
further comprising a top keel and an S-inlet;
wherein the top keel is split and/or divided; and
wherein the S-inlet is routed over and through the top keel and is utilized for cruising and a lift engine.

19. The vertical take-off and landing aircraft of claim 18, further comprising a turbine extension coupled to the front of the adjustably mounted turbine that extends upward and outward from the adjustably mounted turbine to expel gases away from the adjustably mounted turbine.

20. The vertical take-off and landing aircraft of claim 18, wherein the trailing-link landing gear has a rotation angle of 15 degrees to improve shock absorption and cushioning of the vertical take-off and landing aircraft.

\* \* \* \* \*